United States Patent [19]
Kovacevic

[11] Patent Number: 5,288,186
[45] Date of Patent: Feb. 22, 1994

[54] APPARATUS AND METHOD OF HIGH-PRESSURE WATERJET ASSISTED COOLING/LUBRICATION IN MACHINING

[75] Inventor: Radovan Kovacevic, Lexington, Ky.

[73] Assignee: University of Kentucky Research Foundation, Lexington, Ky.

[21] Appl. No.: 948,403

[22] Filed: Sep. 21, 1992

[51] Int. Cl.$^5$ .............................................. B23C 5/28
[52] U.S. Cl. ..................................... 409/131; 407/11; 408/59; 409/136
[58] Field of Search ....................... 409/131, 136, 132; 408/1 R, 56, 57, 59; 407/11

[56] References Cited

U.S. PATENT DOCUMENTS

| | | | |
|---|---|---|---|
| 2,653,517 | 9/1953 | Pigott | 409/132 |
| 4,302,135 | 11/1981 | Lillie . | |
| 4,322,189 | 3/1982 | Briese . | |
| 4,621,955 | 11/1986 | Briese . | |
| 4,693,642 | 9/1987 | Mair et al. . | |
| 4,705,435 | 11/1987 | Christoffel . | |
| 4,929,131 | 5/1990 | Allemann | 409/232 |

FOREIGN PATENT DOCUMENTS

| | | | |
|---|---|---|---|
| 21217 | 2/1982 | Japan | 409/136 |
| 127904 | 7/1985 | Japan | 407/11 |
| 183503 | 6/1992 | Japan | 408/57 |

OTHER PUBLICATIONS

Oct. 1991—Manufacturing Engineering Article Cooler Chip Production.
Feb. 1989 Journal of Engineering for Industry Article Metal Machining With High-Pressure Water-Jet Cooling Assistance—A New Possibility.
May 1971—Journal of Engineering for Industry Article Some Effects of Injecting Cutting Fluids Directly into the Chip-Tool Interface.
1991 Transactions of NAMRI/SME Article—Machining of $\alpha$-$\beta$ Titanium With Ultra-High Pressure Through the Insert Lubrication/Cooling.

*Primary Examiner*—Daniel W. Howell
*Attorney, Agent, or Firm*—King and Schickli

[57] ABSTRACT

An apparatus for high-pressure waterjet assisted machining includes a drive motor, spindle and rotary cutting tool with cutting inserts. The apparatus further includes a high-pressure intensifier pump providing cutting fluid at a pressure greater than 50,000 psi. A cutting fluid conduit system in the rotary cutting tool includes a main flow channel, a distribution manifold, a plurality of radially extending feed channels and a plurality of cooperating nozzles for delivering fluid behind the cutting inserts. The cutting fluid then passes through one or more apertures in the inserts into an interface defined by the inserts of the cutting tool and a chip being cut from the workpiece.

14 Claims, 2 Drawing Sheets

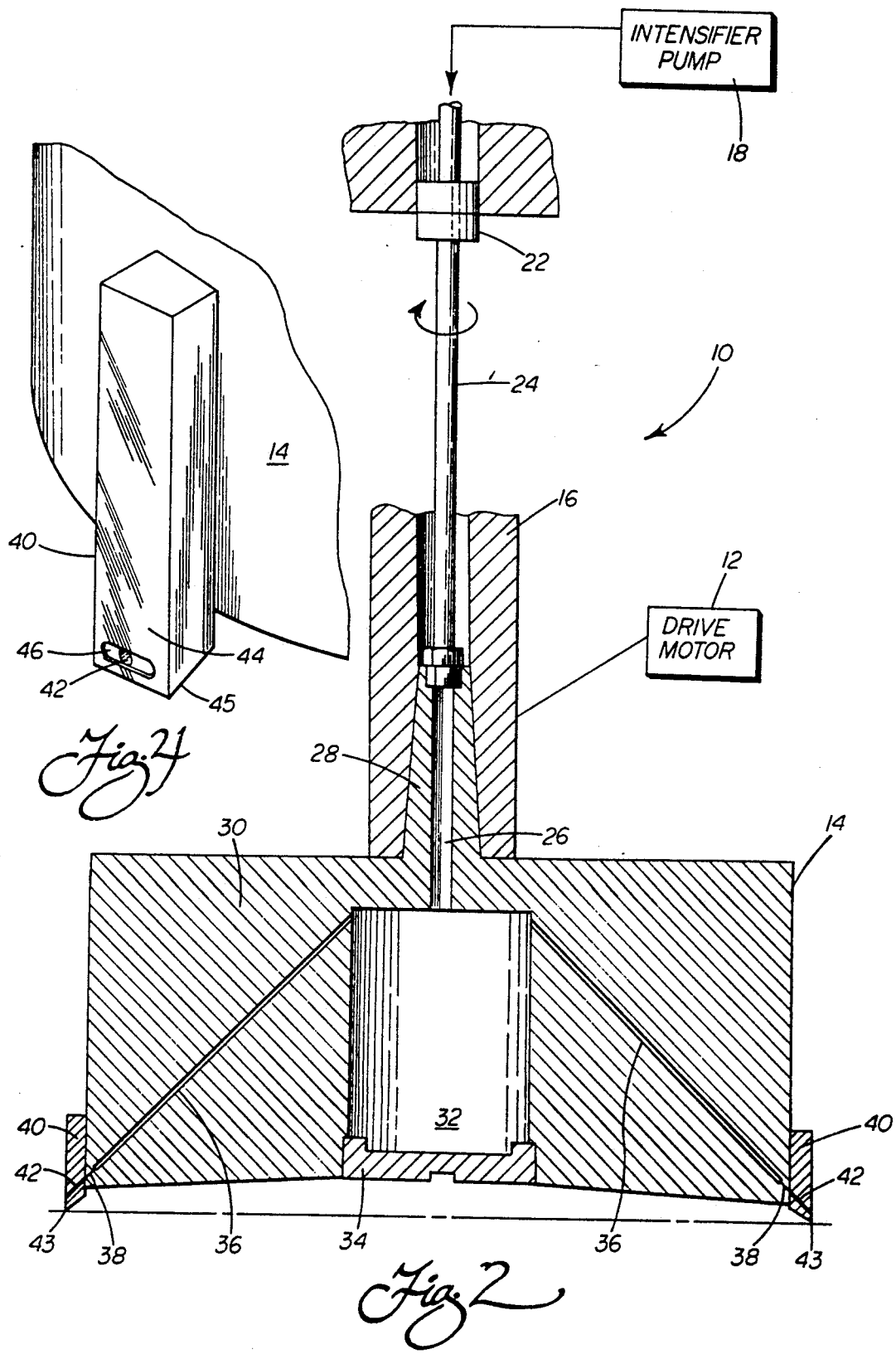

APPARATUS AND METHOD OF HIGH-PRESSURE WATERJET ASSISTED COOLING/LUBRICATION IN MACHINING

TECHNICAL FIELD

The present invention relates generally to the machining field and, more particularly, to an improved apparatus and method for milling or drilling of a workpiece utilizing a high pressure waterjet to assist cooling and lubrication.

BACKGROUND OF THE INVENTION

During metal machining, energy is primarily consumed in the formation and movement of the chip being cut from the workpiece. As such, it should be appreciated that the primary concerns for the efficient and economical machining of a workpiece are related to the rate of chip removal and the length of the service life of the tool being employed. As the rate of chip removal or cutting increases, more heat is generated and the operating temperature of the cutting tool also increases. This increase in temperature may become sufficient to adversely effect the service life of the cutting tool. Accordingly, the overall efficiency of the machining operation is uniquely dependent upon the quick and effective removal of heat, particularly at the tool/chip interface.

In order to achieve effective heat removal, it has been recognized for many years to utilize cutting fluids that not only provide direct cooling but also lubrication for friction reduction and less heat generation. The rate of flow and the direction of application of the cutting fluid are important.

At present, the most common approach utilized to provide a coolant/lubricant to the cutting zone is to provide a flood of fluid directed over the back of the chip. In this manner, heat generated during the contact of the tool with the workpiece is extracted via the chip. Unfortunately, at higher speeds (e.g. over 400 sfpm), it has been shown that cutting fluids applied in this manner lose their effectiveness as coolants. This may be attributed to the greater rate of heat generation due to higher speed machining, the inability of the cutting fluid to reach the cutting tool/chip interface region to be cooled and/or the tendency for faster motion of the chip and workpiece to carry the fluid away from the cutting zone. Accordingly, it should be appreciated that the flood of fluid approach, now commonly practiced in the art, significantly limits machining speeds. Thus, if speed of machining is to be increased, a new approach needs to be developed.

A number of attempts have recently been made to achieve this end and improve cooling and lubrication to allow effective higher speed machining. In what is believed to be the most effective approach to date, a remote nozzle directs a waterjet pressurized up to 40,000 psi toward the tool/chip interface (see FIG. 1). This approach is disclosed in the article "Metal Machining with High-Pressure Water-Jet Cooling Assistance - A New Possibility", from the publication *Journal of Engineering for Industry*, Feb. 1989, volume 111, pages 7–12.

While this approach has achieved promising results, it still suffers from a number of drawbacks. Specifically, at still higher speeds of operation, a remote waterjet is simply not able to direct a stream with sufficient pressure and accuracy so as to fully penetrate into the interface formed between the cutting tool and the chip. Accordingly, this high heat zone does not receive sufficient cooling or lubrication and the rotary cutting tool temperature rises to a level that adversely effects service life. Cutting performance is also adversely affected. Specifically, it should be appreciated that as the rotary cutting tool undergoes wear, chip control by the tool is adversely affected. This serves to adversely effect dimensional accuracy and surface quality. Accordingly, a need is identified for an improved high speed machining apparatus and method.

SUMMARY OF THE INVENTION

It is a primary object of the present invention to provide an apparatus and method of high speed machining with a rotary cutting tool that allow not only the utilization of increased cutting speeds but also better cooling so as to provide the rotary cutting tool with a longer service life. A longer service life, of course, also means less downtime for repair and replacement and accordingly, further enhances the increases in productivity provided by the faster cutting speeds.

Another object of the present invention is to provide an apparatus and method for high-pressure waterjet assisted milling or drilling particularly adapted to improve the machinability of difficult to machine materials As a result, tool life, dimensional accuracy and surface quality during the machining operation are significantly enhanced.

Yet another object of the present invention is to provide an apparatus and method for milling and drilling wherein cutting fluid is directed at high-pressure through the cutting tool and particularly the rake face of the cutting inserts directly into the interface between the inserts and the chip being cut from the workpiece. This advantageously insures that cooling and lubrication are provided at the point of need even during high speed operations. Further, the enhanced cooling and lubrication is provided while drastically reducing cutting fluid consumption over the state of the art flood type approach.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved apparatus and method are provided for more efficient machining operations utilizing a rotary cutting tool.

The apparatus for machining of a workpiece includes a drive motor and a driven rotary cutting tool. The improvement of the present invention relates to the provision of a high-pressure intensifier pump providing cutting fluid at a pressure greater than 30,000 psi and more preferably 50,000 psi. Additionally, the improvement includes the provision of conduit means for delivering and directing the high-pressure cutting fluid from the pump into and through the rotary cutting tool and from there directly into the interface defined by the rotary cutting tool and a chip being cut from the workpiece.

More specifically, high-pressure cutting fluid from the intensifier pump is directed through a swivel, providing sealing at at least 2000 rpm under pressure of 55,000 psi, and a rotating high-pressure tube to a main flow channel in the rotary cutting tool. The main flow channel extends axially through the cutting tool and communicates with a distribution manifold. The distribution manifold directs the cutting fluid through a plurality of radially extending feed channels. The number of radially extending feed channels provided is equal to the number of cutting inserts of carbide or other hard material appropriate for the purpose mounted to the cutting tool.

A sapphire nozzle is provided at the terminal end of each radially extending feed channel directly behind each cutting insert. Each nozzle provides a stream of cutting fluid travelling at a speed of over 1000 feet per second. This stream is directed into a flow aperture formed in the cutting insert. Each flow aperture has a proximal end in communication with one of the nozzles and a distal end extending through the rake face of the insert; that is, the face over which the chip flows from the workpiece. Accordingly, the open distal end is juxtaposed to the chip during machining so as to deliver cutting fluid directly into the interface defined by the insert of the cutting tool and the chip.

Preferably, the distal end of the flow aperture is further positioned so as to be connected to a chip breaking groove formed in the rake face of the insert. In this manner, the high-pressure cutting fluid also better serves to aid in chip formation. Accordingly, overall cutting efficiency is enhanced.

In accordance with a further aspect of the present invention a specially modified rotary cutting tool is provided to distribute a cooling and lubricating fluid into the interface between the cutting tool and the chip. Specifically, the cutting tool includes a body, defining a shank and a head, a plurality of cutting inserts and a conduit system for directing the delivery of cutting fluid through the inserts.

The conduit system includes a main flow channel extending axially through the shank into the head. There the main flow channel communicates with a distribution manifold. A series of radially directed feed channels are arrayed around the distribution manifold. The terminal end of each feed channel communicates with a sapphire nozzle. As described above one nozzle is provided behind each cutting insert. Each one of the nozzles communicates with at least one flow aperture in the associated insert having an open distal end in the rake face of the insert.

In accordance with yet another aspect of the present invention, a method is provided for high-pressure waterjet assisted machining with a rotary cutting tool. The method includes the step of providing cutting fluid at a pressure greater than 30,000 psi and more preferably 50,000 psi and delivering the high-pressure cutting fluid through the rotary cutting tool directly into the interface defined by the rotary cutting tool and the chip being cut from the workpiece.

Advantageously, the method and apparatus function to insure that cutting fluid is delivered where it is needed most. Specifically, by delivering the cutting fluid at the interface between the cutting tool and the chip, penetration into this critical area to provide both cooling and lubrication is insured even at high operating speeds. Accordingly, operating temperatures of the rotary cutting tool are maintained at acceptable levels particularly along the rake face of the cutting tool inserts so as to insure a longer overall service life. Further, when delivered at this position, the high-pressure cutting fluid actually serves to aid in chip formation reducing secondary shear and floating the chip away from the face. Accordingly, better dimensional accuracy and surface quality are provided. Besides these important benefits, the amount of cutting fluid utilized is also reduced when compared with more standard, state of the art approaches wherein cutting fluid is flooded over the back of the chip.

The advantages of the apparatus and method of the present invention are particularly important when milling and/or drilling difficult to machine materials such as titanium and its alloys. These materials exhibit a chemical activity and a poor thermal conductivity when compared to steels that both adversely effect machining efforts. By providing the high-pressure waterjet directly into the tool/chip interface and breaking and floating the chips above and off the tool face, the diffusion cycle observed when cutting titanium is interrupted. Accordingly, the resulting transport of tool constituents away from the cutter flank and rake face into the chip that serves to accelerate and promote tool wear is significantly reduced or substantially eliminated. Of course, as this accelerated tool wear also adversely effects cutting performance, a significant quality control problem is also effectively relieved utilizing the apparatus and method of the present invention.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is a schematical representation of the apparatus of the present invention for high-pressure waterjet assisted machining of a workpiece utilizing a rotary cutting tool;

FIG. 4 is a detailed perspective view showing the open distal end of a cutting fluid flow aperture communicating with a chip breaking groove formed in the rake face of a cutting insert.

Reference will now be made in detail to the present preferred embodiment of the invention, an example of which is illustrated in the accompanying drawing.

DETAILED DESCRIPTION OF THE INVENTION

Figure 3:
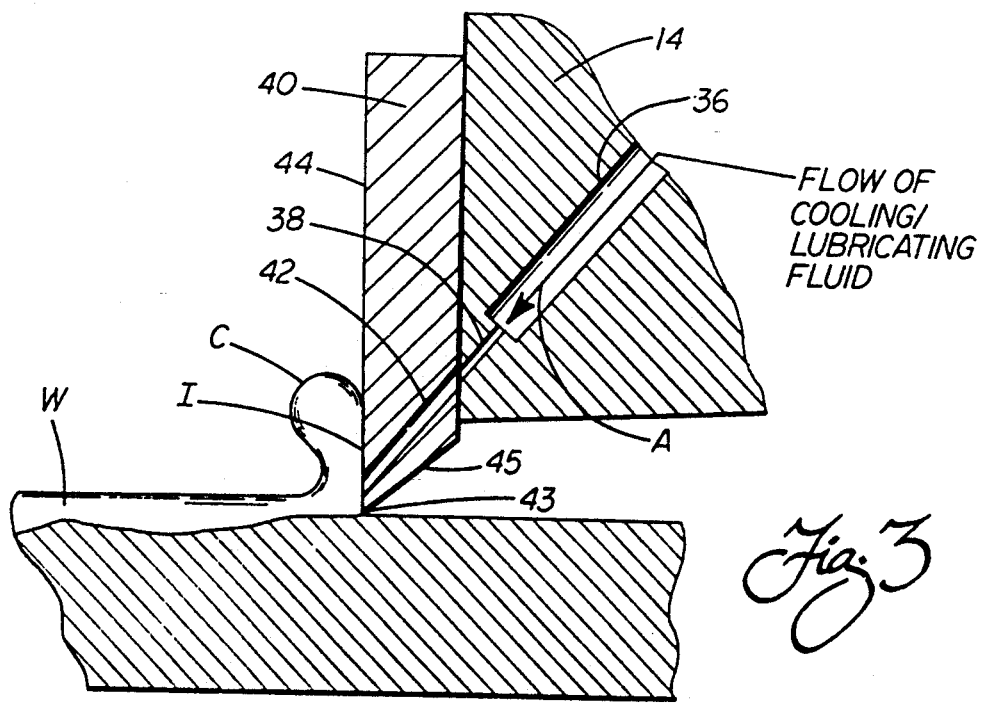
FIG. 3 is a schematical illustration similar to FIG. 1 but showing the direct application of high-pressure cutting fluid into the tool/chip interface through the cutting tool in accordance with the present invention.

Reference is now made to the drawing FIGS. 2 and 3 showing the improved apparatus 10 of the present invention for high speed machining of a workpiece. While the invention is being shown and described with respect to a rotary cutting tool for utilization in a milling operation it must be appreciated that the invention is equally applicable to rotary cutting tools utilized in drilling operations as well.

As is known in the art, a milling apparatus 10 includes a drive motor 12 for rotating a rotary cutting tool 14 through a spindle 16. The apparatus 10 also incorporates various unique/novel improvements including a high-pressure intensifier pump, such as a 9XR-55 intensifier pump available from Flow International of Kent, Wash. The pump 18 is capable of providing cutting fluid (e.g. water) at a pressure greater than 30,000 psi and, more preferably, greater than 50,000 psi at a rate of approximately one gallon per minute.

The pump 18 is operatively connected for fluid communication through a stationary high-pressure feed conduit 20. The distal end of the feed conduit 20 directs the pressurized fluid from the pump 18 into a high-pressure, high speed swivel 22. Swivel 22 is capable of providing good sealing at 2000 rpm under a pressure of 55,000 psi. Such a swivel 22 is also commercially available from Flow International.

As shown, the swivel 22 directs the cutting fluid through the spindle 16 by means of rotating high-pressure tube 24. In turn, high-pressure tube 24 delivers the cutting fluid into the main flow channel 26 extending axially through the shank 28 and head 30 of the cutting tool 14. Sealing is achieved by metal-to-metal contact to prevent loss of pressure.

The distal end of the main flow channel 26 is provided in fluid communication with a distribution manifold 32 formed in the tool head 30 sealed by the plug 34. Cutting fluid received in the distribution manifold 32 is then directed outwardly in a radial direction through a plurality of feed channels 36. Preferably, each feed channel has a diameter of approximately 0.050". As shown in FIG. 2, the distal end of each feed channel is operatively connected to a sapphire nozzle 38 having an inner diameter of between substantially 0.004 and 0.010". Each nozzle 38 s preferably designed to provide a stream of cutting fluid travelling at a speed of over 1000 feet per second to the back side of each cutting insert 40 mounted to the cutting tool head 30. As is known in the art, each insert 40 is formed from a hard material suitable for machining operations including, for example, C-2 carbide.

As best shown in FIGS. 2 and 3, each carbide insert 40 includes at least one flow aperture 42 having a proximal end in communication with one of the nozzles 38 and a distal end opening through the rake face 44 of the insert 40 that contacts and cuts the chip C from the workpiece W during machining. Preferably, the flow aperture 42 is aligned with the associated nozzle 38 and feed channel 36 so as to minimize any erosion effect the high pressure fluid could have. Further, the flow aperture 42 preferably has a diameter of approximately 0.030" to provide delivery at the desired pressure.

As more particularly shown in FIG. 3, the flow aperture 42 effectively serves to deliver (note action arrow A) the cutting fluid at pressures above 30,000 psi and more preferably above 50,000 psi directly into the interface I defined by the rake face 44 of the carbide insert 40 and the chip C being cut from the workpiece W. Preferably, the open distal end of the flow aperture 42 is provided approximately 0.030" from the tip 43 of the insert. From that position, the flow aperture 42 provides the cutting fluid "deep" in the interface I near the tip of the insert 40 in the area of heat generation where it cannot effectively penetrate when supplied through a remote nozzle. Hence, better cooling and lubrication is insured. Further, the flow aperture is, advantageously, not positioned so close to the tip as to mechanically weaken the insert and thereby adversely effect insert durability.

By providing a flow of coolant directly juxtaposed to the chip C into the hot zone of the rake face 44 where it is needed most, better lubrication is provided during cutting and friction is therefore reduced. This serves to reduce the load on the cutting tool 14 and the milling apparatus 10. Thus, temperatures are significantly reduced during milling operations at any speed. Advantageously, the high-pressure cutting fluid also serves to break or float the chips above and off the rake face 44 during machining thereby reducing the operating temperatures of the insert 40. Of course, reduced operating temperatures serve to extend the service life of the inserts 40 and tool 14 thereby increasing productivity and reducing manufacturing costs including both capital expenditures for cutting tools and down time for repair/replacement.

In addition, by lifting and floating the chip C away from the rake face 44, the chemical activity or diffusion cycle observed when cutting titanium is effectively interrupted. Accordingly, cutting tool constituents are not transported away from the flank 45 and rake face 44 of the inset 40 into the chip C. As a result of all of these factors, tool wear is significantly reduced and dimensional accuracy and surface quality resulting from the machining operation utilizing the improved high speed machining apparatus 10 and method of the present invention are significantly enhanced. Further, these benefits are obtained while reducing the overall amount of cutting fluid required (about one gallon per minute) when compared to prior art cutting fluid flooding approaches as described earlier in this document that use several times the amount.

As shown in detail in FIG. 4, it is further preferred to have the distal end opening of the flow aperture 42 connected to a chip breaking groove 46 formed in the rake face 44 of the insert 40. In this way, the high-pressure fluid is effectively utilized not only as a source of cooling and lubrication but the force of the fluid is also effectively utilized to advantage as an aid in chip control and formation. Thus, cutting efficiency is further enhanced.

Figure 1:
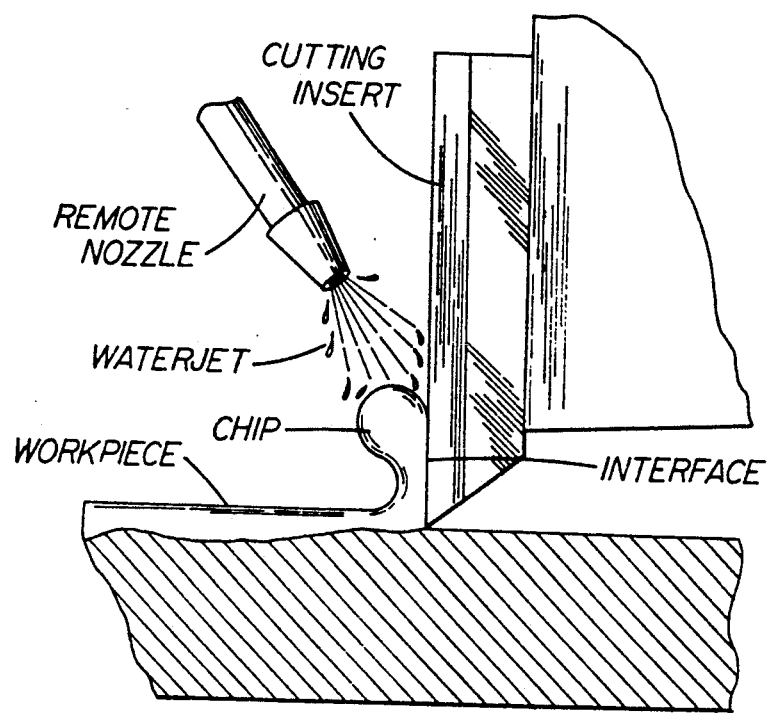
FIG. 1 is a schematical illustration of the prior art method of directing the high-pressure cutting fluid jet into the tool/chip interface from a remote nozzle.

In summary, numerous benefits result from employing the concepts of the present invention. Specifically, both lubricating and cooling action are directly provided at the cutting tool/chip interface I where they are needed the most. Specifically, by directing the cutting fluid through the rake face 44 of the insert 40, cutting fluid is delivered directly at the point of need. This is important as at higher cutting speeds, the rapid motion of the cutting tool and chip effectively function to carry fluid away from the cutting zone thereby preventing capillary action from drawing the fluid into the interface. Further, the higher speeds of the cutting operation and the resulting high speed motion of the cutting tool and chip also function to effectively prevent cutting fluid directed by remote high-pressure waterjets of the type known in the art (see FIG. 1) from penetrating into this interface and providing the desired cooling and lubrication at the true point of need/heat generation.

The resulting improvements in cooling and lubrication exhibited by the present invention serve to effectively reduce the operating temperature of the cutting tool even at higher operating speeds of over 400 sfpm. Accordingly, tool life is significantly extended. Further, cutting efficiency may be significantly enhanced particularly when the cutting fluid is delivered in alignment and along a chip breaking groove 46 formed in the insert 40.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, a control unit may be provided to restrict the passage of cutting fluid through the inserts when not in contact with the workpiece. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. In an apparatus for machining of a workpiece, said apparatus including a drive motor and a rotary cutting tool, the improvement comprising:
   a high-pressure intensifier pump providing cutting fluid at a pressure greater than 30,000 psi; and
   conduit means for delivering and directing said high-pressure cutting fluid from said pump through said rotary cutting tool directly into an interface defined by said rotary cutting tool and a chip being cut from said workpiece;
   said conduit means including a main flow channel, a distribution manifold and a plurality of radially directed feed channels all formed in said rotary cutting tool and providing serial communication for the passage of cutting fluid.

2. The apparatus set forth in claim 1, wherein said rotary cutting tool includes a plurality of cutting inserts.

3. The apparatus set forth in claim 2, wherein said conduit means further includes a plurality of nozzles, one nozzle at a terminal end of each radially extending feed channel and behind each cutting insert.

4. The apparatus set forth in claim 3, wherein each nozzle provides a stream of cutting fluid traveling at a speed of over 1,000 ft/sec.

5. The apparatus set forth in claim 4, wherein said cutting inserts each include at least one flow aperture having a proximal end in communication with one of said nozzles and a distal end juxtaposed to said chip during machining so as to deliver cutting fluid directly into said interface defined by said cutting tool and said workpiece.

6. The apparatus set forth in claim 5, wherein each said cutting insert includes a chip breaking groove and said distal end of said at least one flow aperture is connected to said groove.

7. The apparatus set forth in claim 6, wherein said conduit means further includes a swivel and cooperating rotating high-pressure tube for the passage of cutting fluid from said pump to said main flow channel in said rotary cutting tool, said swivel providing a sealing at at least 2000 RPM under a pressure of 55,000 PSI.

8. The apparatus set forth in claim 7, wherein said cutting fluid is provided at a pressure at least as great as 50,000 psi.

9. A rotary cutting tool comprising a tool body including a shank and a head;
   a plurality of cutting inserts fixed to said tool body; and
   a conduit means for delivering and directing high-pressure cutting fluid through said tool body including (a) a main flow channel extending axially through said shank into said head, (b) a distribution manifold for receiving cutting fluid from said main flow channel, (c) a plurality of feed channels extending radially from said distribution manifold, one feed channel per insert, (d) a cooperating flow aperture in each insert for receiving cutting fluid from a cooperating feed channel, and (e) a sapphire nozzle between each feed channel and cooperating flow aperture of each insert;
   whereby cutting fluid is directed into an interface defined between said rotary cutting tool insert and a chip being cut from a workpiece.

10. The rotary cutting tool set froth in claim 9, wherein said flow aperture of each insert is aligned with said feed channel with which said flow aperture cooperates so as to minimize erosion by said cutting fluid.

11. The rotary cutting tool set forth in claim 10, wherein each of said cutting inserts includes a rake face and a tip and said flow aperture in each insert includes a distal end opening through said rake face substantially 0.030" from said tip.

12. The rotary cutting tool set forth in claim 11, wherein each of said cutting inserts includes a chip breaking groove, said distal end of said flow aperture of each insert opening into said chip breaking groove.

13. A method of machining with a rotary cutting tool, comprising the steps of:
   providing cutting fluid at a pressure greater than 30,000 psi; and
   delivering said high-pressure cutting fluid through said rotary cutting tool directly into an interface defined by said rotary cutting tool and a chip being cut from said workpiece by directing said high-pressure cutting fluid through an aperture in said rotary cutting tool juxtaposed to said chip during the machining operation.

14. A method of machining with a rotary cutting tool, comprising the steps of:
   providing cutting fluid at a pressure greater than 50,000 psi; and
   delivering said high-pressure cutting fluid through said rotary cutting tool directly into an interface defined by said rotary cutting tool and a chip being cut from said workpiece by directing said high-pressure cutting fluid through an aperture in said rotary cutting tool juxtaposed to said chip during the machining operation.

* * * * *